United States Patent
Zhang

(10) Patent No.: US 12,126,876 B2
(45) Date of Patent: Oct. 22, 2024

(54) THEME VIDEO GENERATION METHOD AND APPARATUS, ELECTRONIC DEVICE, AND READABLE STORAGE MEDIUM

(71) Applicant: Beijing Zitiao Network Technology Co., Ltd., Beijing (CN)

(72) Inventor: Shupeng Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 11 days.

(21) Appl. No.: 18/008,090

(22) PCT Filed: May 31, 2021

(86) PCT No.: PCT/CN2021/097314
§ 371 (c)(1),
(2) Date: Dec. 2, 2022

(87) PCT Pub. No.: WO2021/244480
PCT Pub. Date: Dec. 9, 2021

(65) Prior Publication Data
US 2023/0239546 A1 Jul. 27, 2023

(30) Foreign Application Priority Data
Jun. 5, 2020 (CN) .......................... 202010507431.2

(51) Int. Cl.
*H04N 21/81* (2011.01)
*H04N 21/431* (2011.01)

(52) U.S. Cl.
CPC ......... *H04N 21/816* (2013.01); *H04N 21/431* (2013.01)

(58) Field of Classification Search
CPC .......................... H04N 21/816; H04N 21/431
See application file for complete search history.

(56) References Cited

U.S. PATENT DOCUMENTS

| | | | |
|---|---|---|---|
| 2003/0009392 A1 | 1/2003 | Perkowski | |
| 2014/0214625 A1 | 7/2014 | Mao | |
| (Continued) | | | |

FOREIGN PATENT DOCUMENTS

| | | |
|---|---|---|
| CN | 104919493 A | 9/2015 |
| CN | 105975612 A | 9/2016 |
| (Continued) | | |

OTHER PUBLICATIONS

International Search Report and Written Opinion, mailed on Aug. 26, 2021, International application No. PCT/CN2021/097314.

*Primary Examiner* — Mulugeta Mengesha
(74) *Attorney, Agent, or Firm* — Astute IP Law Group

(57) ABSTRACT

Disclosed are a theme video generation method and apparatus, an electronic device and a readable storage medium. method includes: after acquiring a selection triggering operation on a target theme, sending a theme resource package acquisition request to a corresponding resource server; receiving the corresponding theme resource package that is fed back by the resource server in response to the theme resource package acquisition request, acquiring at least one target picture from a local album based on the at least one target picture label; and generating a corresponding theme video based on the least one target picture.

15 Claims, 5 Drawing Sheets

(56) References Cited

U.S. PATENT DOCUMENTS

| | | | | |
|---|---|---|---|---|
| 2015/0155008 A1* | 6/2015 | Herberger | ............ | G11B 27/034 386/224 |
| 2018/0068019 A1* | 3/2018 | Novikoff | ............. | G06F 16/7867 |
| 2020/0082850 A1* | 3/2020 | He | ........................ | G11B 27/28 |
| 2021/0005223 A1* | 1/2021 | Wang | .................... | G06F 3/0482 |

FOREIGN PATENT DOCUMENTS

| | | | |
|---|---|---|---|
| CN | 106909548 A | 6/2017 | |
| CN | 108009293 A | 5/2018 | |
| CN | 108377351 A | 8/2018 | |
| CN | 108921918 A | 11/2018 | |
| CN | 108924439 A | 11/2018 | |
| CN | 109068070 A | 12/2018 | |
| CN | 109618222 A | 4/2019 | |
| CN | 110536177 A | 12/2019 | |
| CN | 110557565 A | 12/2019 | |
| CN | 110825912 A | 2/2020 | |
| CN | 111669620 A | 9/2020 | |

\* cited by examiner receiving a target picture recommendation request sent by a client. The target picture recommendation request includes at least one target picture label, and the at least one target picture label is acquired from a corresponding resource server after the client acquires a selection trigger operation on the target theme — S501 acquiring at least one target picture from a local album based on the at least one target picture label, and feeding back the at least one target picture to the client in response to the target picture recommendation request, so that the client generates corresponding theme video based on the at least one target picture — S502

FIG. 5

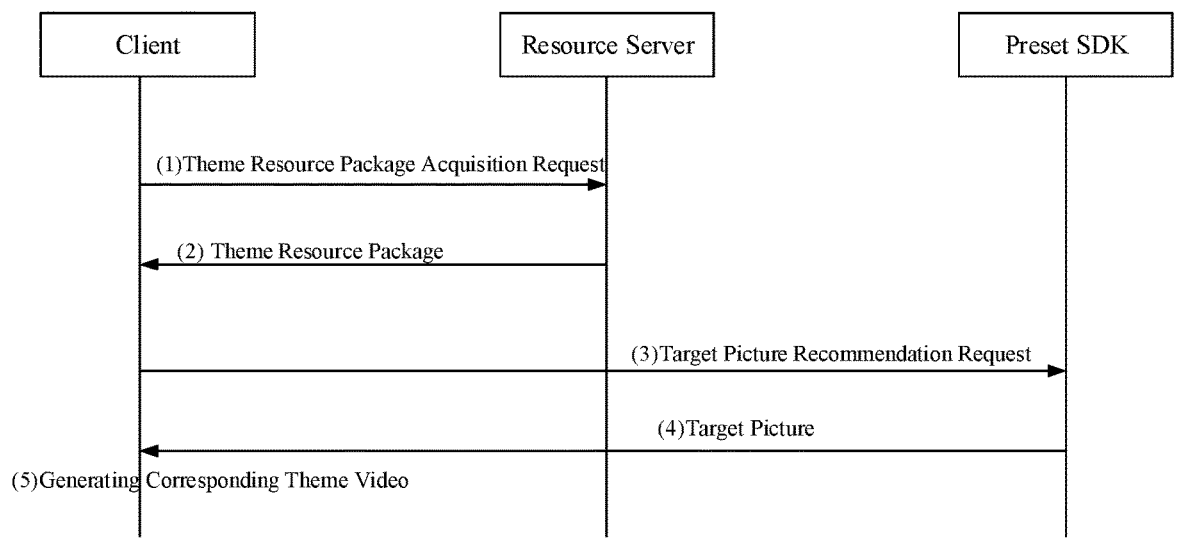

FIG. 6

THEME VIDEO GENERATION METHOD AND APPARATUS, ELECTRONIC DEVICE, AND READABLE STORAGE MEDIUM

This is a national stage application filed under 35 U.S.C. 371 based on International Patent Application No. PCT/CN2021/097314, filed May 31, 2021, which claims priority to Chinese Patent Application No. 202010507431.2 filed on Jun. 5, 2020, the disclosures of which are incorporated herein by reference in their entireties.

TECHNICAL FIELD

Embodiments of the present disclosure relate to the technical field of computer technology, in particular to a theme video generation method, apparatus, electronic device and readable storage medium.

BACKGROUND

With the development of mobile internet, users can make videos on various topics, e.g., delicious food, scenery or vacation videos, through album type applications (APPs).

SUMMARY

This summary section is provided to introduce ideas in a brief form, which is described in detail in the following detailed description section. This summary is not intended to identify key features or essential features of the claimed technical solution and also is not intended to limit the scope of the claimed technical solution.

One aspect, the present disclosure provides a theme video generation method, including:
  after acquiring a selection trigger operation on a target theme, sending a theme resource package acquisition request to a corresponding resource server, wherein the theme resource package acquisition request includes identification information of the target theme, so that the corresponding resource server acquires a corresponding theme resource package based on the identification information;
  receiving the corresponding theme resource package that is fed back by the corresponding resource server in response to the theme resource package acquisition request, wherein the corresponding theme resource package includes at least one target picture label corresponding to the target theme;
  acquiring at least one target picture from a local album based on the at least one target picture label; and
  generating a corresponding theme video based on the at least one target picture.

Second aspect, the present disclosure provides a theme video generation apparatus, including:
  a theme resource package acquisition request sending module, configured to, after acquiring a selection trigger operation on a target theme, send a theme resource package acquisition request to a corresponding resource server, wherein the theme resource package acquisition request includes identification information of the target theme, so that the corresponding resource server acquires a corresponding theme resource package based on the identification information;
  a theme resource package receiving module, configured to receive the corresponding theme resource package that is fed back by the corresponding resource server in response to the theme resource package acquisition request, wherein the corresponding theme resource package includes at least one target picture label corresponding to the target theme;
  a target picture acquisition module, configured to, based on the at least one target picture label, acquire at least one target picture from a local album; and
  a theme video generation module, configured to, based on the at least one target picture, generate a corresponding theme video.

Third aspect, the present disclosure provides an electronic device, including: a memory and a processor,
  computer programs are stored in the memory, and
  the processor is configured to execute the computer programs to implement the method provided by embodiments of the first aspect and embodiments of the second aspect.

Fourth aspect, the present disclosure provides a computer readable storage medium, computer programs are stored on the computer readable storage medium, and in a case where the computer programs are executed by a processor, the method provided by embodiments of the first aspect and embodiments of the second aspect is implemented.

BRIEF DESCRIPTION OF THE DRAWINGS

In order to more clearly explain the technical solutions in the embodiments of the present disclosure, the following briefly introduce the drawings that need to be used in the description of the embodiments of the present disclosure.

FIG. 5 is a schematic flow diagram of another theme video generation method provided by embodiments of the present disclosure.

FIG. 6 is an information interaction diagram in the implementation process of the theme video generation method provided by embodiments of the present disclosure.

DETAILED DESCRIPTION

Figure 1:
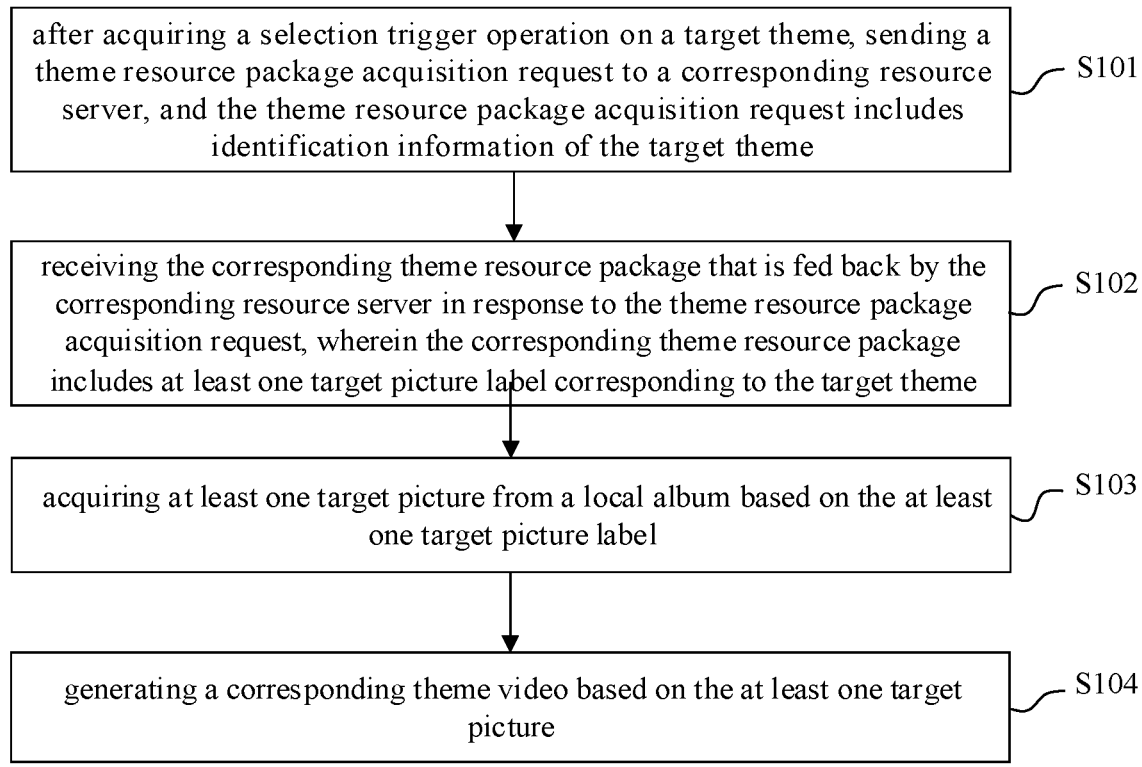
FIG. 1 is a schematic flow diagram of a theme video generation method provided by embodiments of the present disclosure.

The embodiments of the present disclosure are described in detail below, an example of embodiments is illustrated in the accompanying drawings, and the same or similar designator throughout indicates the same or similar components or components having the same or similar functions. The following embodiments described by reference to the drawings are exemplary and are intended only to explain the present disclosure, and cannot be construed as a limitation of the present disclosure.

Those skilled in the art may understand that, unless specifically stated, the singular forms "one", "a", "described" and "the" used herein may also include the plural. It should be further understood that the term "includes" as used in the description of the present disclosure refers to the presence of said features, integers, steps, operations, elements, and/or assemblies, but does not exclude the presence or addition of one or more other features, integers, steps, operations, components, assemblies and/or groups thereof. It should be understood that when we call a component "connected" or "coupled" to another component, it can be directly connected or coupled to other components, or intermediate components may also exist. Further, the term "connection" or "coupling" used herein may include a wireless connection or wireless coupling. The term "and/or" as used herein includes all or any unit and all combinations of one or more associated listed items.

As for the existing album type APPs, a user needs to select corresponding materials (such as pictures or videos) by themself when making a theme video. Specifically, after selecting a theme in an APP, the user needs to select corresponding materials in local album independently, and the APP generates corresponding theme video based on the materials selected by the user.

However, in a case where the user selects materials independently, it is difficult to select materials matching the theme, so that the content of the finally generated theme video is poor.

In a theme video generation method provided by embodiments of the present disclosure, in a process of generating a theme video, the user only needs to select a required target theme, and the client can acquire at least one picture label corresponding to the target theme from a source server, then acquire at least one target picture corresponding to the at least one target picture label from a local album based on the at least one picture label, and finally generate a corresponding theme video based on the at least one target picture that is acquired. In the technical solution, the user do not need to select at least one target picture independently, and the at least one corresponding target picture is acquired by at least one picture label corresponding to the target theme, so that the at least one target picture that is acquired can match the target theme better, and the content of the finally generated theme video can be better.

In order to make the objectives, the technical solutions and the advantages of the present disclosure more clear, further detailed description is given below to the embodiments of the present disclosure with reference to the drawings.

FIG. 1 is a schematic flow diagram of a theme video generation method provided by embodiments of the present disclosure. An execution entity of the method may be a client capable of providing a theme video generation service. As shown in FIG. 1, the method may include steps as follows.

Step S101: after acquiring a selection trigger operation on a target theme, sending a theme resource package acquisition request to a corresponding resource server, and the theme resource package acquisition request includes identification information of the target theme, so that the corresponding resource server acquires a corresponding theme resource package based on the identification information.

In a case where a user uses the client providing the theme video generation service, the client can provide a plurality of different themes for the customer so that the user can select as required. The target theme is a theme selected by the user, and the user wants the client to generate a theme video corresponding to the target theme. For example, themes that provided to the user by a specific client providing the theme video generation service include "nine-square-grid", "Sand Painting", "Cool 3D" and the like. If the user selects the theme "nine-square-grid", the target theme is "nine-square-grid", and the user wants the client to generate a "nine-square-grid" theme video.

Specifically, the user sends a selection trigger operation on the target theme, that is, sends an instruction of generating a theme video corresponding to the target theme, and the client sends a theme resource package acquisition request to the corresponding resource server after receiving the instruction, so as to acquire a theme resource package corresponding to the target theme from the corresponding resource server, so as to acquire at least one target picture corresponding to the target theme based on the theme resource package subsequently, thereby generating the corresponding theme video. The theme resource package acquisition request includes identification information of the target theme selected by the user. After acquiring the identification information of the target theme, the resource server matches corresponding theme resource package from a plurality of theme resource packages stored in the resource server based on the identification information after acquiring the identification information of the target theme.

Step S102: receiving the corresponding theme resource package that is fed back by the corresponding resource server in response to the theme resource package acquisition request. The corresponding theme resource package includes at least one target picture label corresponding to the target theme.

The theme resource package also includes a plurality of target picture labels corresponding to the target theme except video rendering data. Target picture labels indicate the content of the target picture, so as to use for acquiring corresponding target picture subsequently.

Specifically, the resource server acquires corresponding theme resource package based on the identification information of the target theme included in the theme resource package acquisition request that is received and then feeds back the theme resource package to the client.

Step S103: acquiring at least one target picture from a local album based on the at least one target picture label.

Specifically, a target picture recommendation request is sent to a preset Software Development Kit (SDK) arranged on the client of the local album, and the target picture recommendation request includes at least one target picture label, so that the preset SDK acquire at least one target picture from the local album based on the at least one target picture label. The preset SDK is arranged on client corresponding to the local album, the preset SDK can utilize a preset image recognition algorithm to perform image recognition on a picture in the local albums and mark corresponding picture label for a picture according to the image recognition result of each picture. It should be noted that each picture may correspond to a plurality of picture labels. It can be understood that the process of marking the picture labels for the pictures in the local album by the preset SDK may be performed in advance before the client running.

Specifically, after the preset SDK receives the target picture recommendation request sent by the client, the preset SDK acquires a plurality of corresponding target pictures from the local album according to the a plurality of target picture labels included in the target picture recommendation request. Specifically, the preset SDK compares various target picture labels with the picture labels of the pictures in the local album, and takes pictures in the local album matched with various target picture labels as target pictures. It can be understood that each target picture label may correspond to a plurality of pictures in the local album.

S104: generating a corresponding theme video based on the at least one target picture.

Specifically, at least one target picture fed back by the preset SDK in response to the target picture recommendation request is received, and the corresponding theme video is generated based on the at least one target picture. Specifically, the preset SDK sends the at least one target pictures that acquired to the client. As known from the above description, each target picture label can correspond to a plurality of pictures in the local album, that is, each target picture label may correspond to a plurality of target pictures, and subsequently, all the target pictures corresponding to various target picture labels can be sent to the client, or only partial target pictures corresponding to various target picture labels are sent to the client. The client generates the theme video based on target pictures and rendering data of corresponding theme resource package.

In the technical solution provided by the present disclosure, in a process of generating a theme video, the user only needs to select a required target theme, and the client can acquire at least one picture label corresponding to the target theme from a source server, then acquire at least one target picture corresponding to the at least one target picture label from a local album based on the at least one picture label, and finally generate a corresponding theme video based on the at least one target picture that is acquired. In the technical solution, the user do not need to select at least one target picture independently, and the at least one corresponding target picture is acquired by at least one picture label corresponding to the target theme, so that the at least one target picture that is acquired can match the target theme better, and the content of the finally generated theme video can be better.

In one optional embodiment of the present disclosure, before acquiring the selection trigger operation on the target theme by a user, the method further includes:
    displaying a current theme display page by a display interface, so as to display a theme in at least one theme; and
    in a case where a drag trigger operation on the current theme display page is received, switching from the current theme display page to another theme display page, so as to display another theme in the at least one theme.

Specifically, in the process that the user uses the client to generate the theme video, the client displays a plurality of themes to be selected to the user for the user to select at first. Specifically, a theme display interface (that is a theme display page) is displayed in the display interface of the client; each theme display interface may display content of one theme, such as the name and the effect preview; and the user can switch from the current theme display interface to another theme display interface in the display interface by the drag operation (that is the drag trigger operation), so as to switch and view the content of various themes to be selected by drag operation, thereby determining to select which theme as the target theme.

Figure 2A:
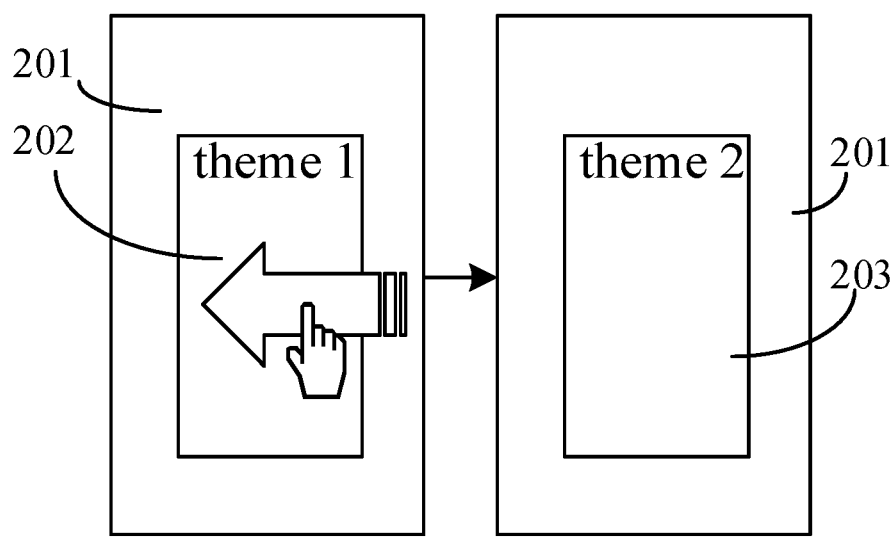
FIG. 2A is a schematic diagram of dragging the current theme display page to the left to switch to the next theme display page in one example of embodiments of the present disclosure.
Figure 2B:
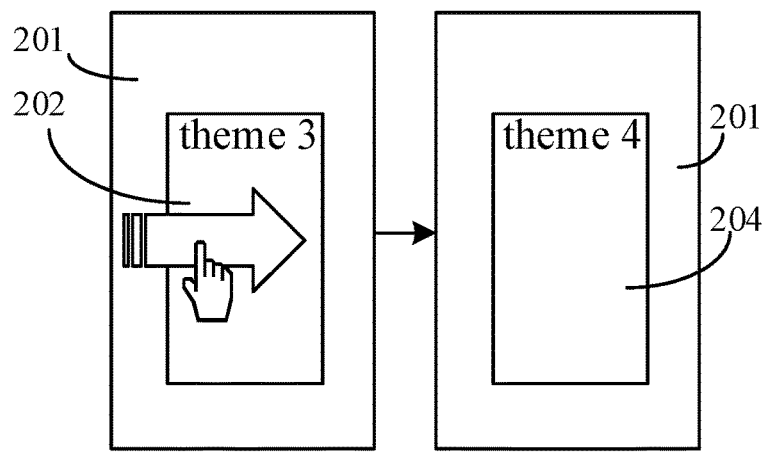
FIG. 2B is a schematic diagram of dragging the current theme display page to the right to switch to the previous theme display page in one example of embodiments of the present disclosure.

For example, as shown in FIG. 2A and FIG. 2B, a specific client providing the theme video generation service provides three themes to be selected, including theme 1, theme 2 and theme 3; the current theme display interface 202 is displayed in a display interface 201 and shows the content of the theme 1. As shown in FIG. 2A, if the user drags the current theme display interface 202 to the left, switching to the next theme display interface 203 which displays the content of the theme 2; and as shown in FIG. 2B, if the user drags the current theme display interface 202 to the right, switching to the previous theme display interface 204 which displays the content of the theme 3.

In one optional embodiment of the present disclosure, after acquiring the selection trigger operation on the target theme, sending the theme resource package acquisition request to the corresponding resource server includes:
    after acquiring the selection trigger operation on the target theme by the current theme display page, displaying a target picture recommendation inquiry page in the display interface; and
    in response to acquiring a confirmation recommendation trigger operation by the target picture recommendation inquiry page, sending the theme resource package acquisition request to the corresponding resource server.

Specifically, after receiving the instruction of generating the theme video corresponding to the target theme sent by the user, the client needs to ask the user whether the recommendation of the target pictures is required, and performs the next operation after acquiring a confirmation instruction of the user, that is, the client sends the theme resource package acquisition request to the corresponding resource server.

Specifically, after receiving the instruction of generating the theme video corresponding to the target theme sent by the user, the client displays the target picture recommendation inquiry page to the user by the display interface, so as to ask the user whether the recommendation of the target pictures is required. If the user sends an instruction of confirming the recommendation of the target pictures, the client sends the theme resource package acquisition request to the corresponding resource server and acquires corresponding target pictures by the method described in the above embodiments. If the user sends an instruction of canceling the recommendation of the target pictures, the client can directly call the pictures in the local album for the user to select, and then obtain corresponding target pictures.

Figure 3:
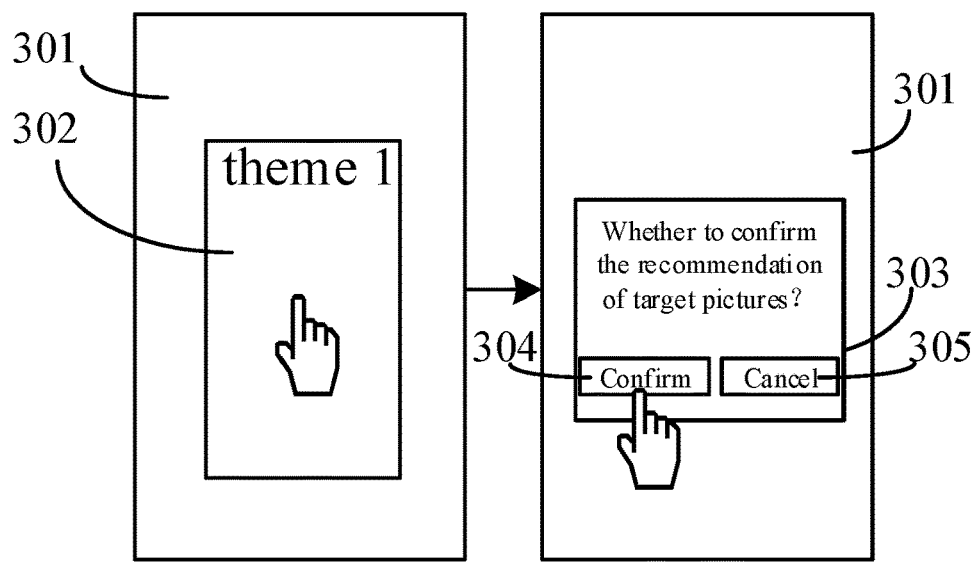
FIG. 3 is a schematic diagram of displaying a target picture recommendation inquiry page in one example of embodiments of the present disclosure.

For example, as shown in FIG. 3, in the left figure, a display interface 301 of the client displays the current theme display page 302 which displays the content of the theme 1; the user clicks the theme display page 302, that is, sending an instruction of generating a theme video corresponding to the theme 1; the client displays a target picture recommendation inquiry page 303 by the display interface 301 after receiving the instruction; a confirmation button 304 and a cancel button 305 are set on the target picture recommendation inquiry page 303; and the user can send an instruction of confirming the recommendation of the target pictures by clicking the confirmation button 304, and send an instruction of canceling the recommendation of the target pictures by clicking the cancel button 305.

In one optional embodiment of the present disclosure, generating the corresponding theme video based on the at least one target picture includes:
    displaying a target picture display page in a display interface, and the target picture display page includes the at least one target picture, so that a user selects a required target picture from the at least one target picture; and generating the corresponding theme video based on the required target picture selected by the user.

Specifically, the client displays a plurality of target pictures in the target picture display page after acquiring a plurality of target pictures, the user can select a required target picture from the plurality of target pictures that is displayed based on own preferences, and finally, the client generates the corresponding target theme video based on the required target picture selected by the user.

Figure 4:
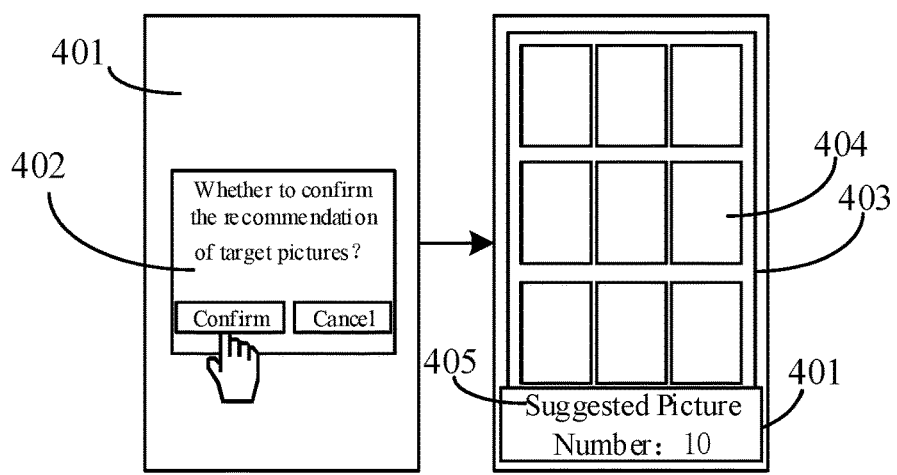
FIG. 4 is a schematic diagram of displaying a target picture display page in one example of embodiments of the present disclosure.

For example, as shown in FIG. 4, after the client receives the instruction of confirming the recommendation of the target pictures sent by the user through the target picture recommendation inquiry page 402 displayed in the display interface 401, as known from the above description, the preset SDK sends the target pictures corresponding to the target theme to the client, and the client displays the target picture display page 403 in the display interface 401 to display the target pictures 404 sent by the preset SDK after receiving these target pictures. By viewing target pictures, the user may select a required target picture by checking target pictures. It can be understood that in the case where the number of target pictures is large, the target picture display page 403 may not be able to display all the target pictures at once, and the user can view the non-displayed target pictures by drag down.

In one optional embodiment of the present disclosure, the corresponding theme resource package further includes a suggested picture number corresponding to the target theme, and the method further includes:
 displaying the suggested picture number at a preset position of the target picture display page, so that in a case where the user selects the required target picture from the at least one target picture, the suggested picture number is taken as a reference to determine a count of required target pictures.

The theme resource package corresponding to the target theme further includes the suggested picture number which may be taken as a reference number when the user selects target pictures.

Specifically, the suggested picture number is displayed at the preset position of the target picture display page. For example, in FIG. 4, the suggested picture number is displayed at a preset position 405 of the target picture display page, and when the user selects the required target picture by the target picture display page, the user may refer to the suggested picture number and select target pictures of which the number is equal to or close to the suggested picture number as the required pictures, so that the content of the finally generated theme video can have higher quality.

In one optional embodiment of the present disclosure, acquiring the at least one target picture from the local album based on the at least one target picture label includes:
 comparing the at least one target picture label with corresponding picture labels of various pictures in the local album, respectively, and taking a picture in the local album as a target picture. A picture label of the target picture is matched with any one of the at least one target picture label, and each of pictures in the local album is marked with a corresponding picture label in advance.

FIG. 5 is a schematic flow diagram of a theme video generation method provided by embodiments of the present disclosure. An execution entity of the method may be the preset SDK arranged on the client of the local album. As shown in FIG. 5, the method may include steps as follows.

Step S501: receiving a target picture recommendation request sent by a client. The target picture recommendation request includes at least one target picture label, and the at least one target picture label is acquired from a corresponding resource server after the client acquires a selection trigger operation on the target theme.

The user sends the selection trigger operation on the target theme, that is, sends the instruction of generating the theme video corresponding to the target theme. The client sends the theme resource package acquisition request to the corresponding resource server after receiving the instruction, so as to acquire the theme resource package corresponding to the target theme from the resource server, thereby acquiring the target pictures corresponding to the target theme based on the theme resource package subsequently, so that the corresponding theme video is generated. The theme resource package acquisition request includes the identification information of the target theme selected by the user, and after acquiring the identification information of the target theme, the resource server matches corresponding theme resource package from a plurality of theme resource packages stored in the resource server based on the identification information after acquiring the identification information of the target theme. The resource server acquires corresponding theme resource package according to the identification information of the target theme included in the received theme resource package acquisition request, and feeds back the theme resource package to the client.

Specifically, the client makes the target picture labels in the theme package to be carried in the target picture recommendation request to send to the preset SDK.

Step S502: acquiring at least one target picture from a local album based on the at least one target picture label, and feeding back the at least one target picture to the client in response to the target picture recommendation request, so that the client generates corresponding theme video based on the at least one target picture.

In the technical solution provided by the present disclosure, in a process of generating a theme video, the user only needs to select a required target theme, and the client can acquire at least one picture label corresponding to the target theme from a source server, then acquire at least one target picture corresponding to the at least one target picture label from a local album based on the at least one picture label, and finally generate a corresponding theme video based on the at least one target picture that is acquired. In the technical solution, the user do not need to select at least one target picture independently, and the at least one corresponding target picture is acquired by at least one picture label corresponding to the target theme, so that the at least one target picture that is acquired can match the target theme better, and the content of the finally generated theme video can be better.

In one optional embodiment of the present disclosure, the method may further includes:
 obtaining a corresponding image recognition result by performing image recognition on the pictures in the local album respectively; and
 acquiring a picture label corresponding to a picture based on the corresponding image recognition result of each picture, and marking the picture by using the picture label.

Correspondingly, acquiring the at least one target picture from the local album based on the at least one target picture label includes:
 comparing the at least one target picture label with corresponding picture labels of various pictures in the local album, respectively, and taking a picture in the local album as a target picture, wherein a picture label of the target picture is matched with any one of the at least one target picture label.

The preset SDK is arranged on client corresponding to the local album, the preset SDK can utilize a preset image recognition algorithm to perform image recognition on a picture in the local albums and mark corresponding picture label for a picture according to the image recognition result of each picture. It should be noted that each picture may correspond to a plurality of picture labels. It can be understood that the process of marking the picture labels for the pictures in the local album by the preset SDK may be performed in advance before the client running.

Specifically, after receiving the target picture recommendation request sent by the client, the preset SDK acquires a plurality of corresponding target pictures from the local album based on a plurality of target picture labels included in the target picture recommendation request. Specifically, the preset SDK compares various target picture labels with the picture labels of the pictures in the local album, and take pictures in the local album matched with various target picture labels as target pictures. It can be understood that each target picture label can correspond to a plurality of pictures in the local album.

The preset SDK sends the at least one of target pictures that acquired to the client. As known from the above description, each target picture label can correspond to a plurality of pictures in the local album, that is, each target picture label may correspond to a plurality of target pictures, and subsequently, all the target pictures corresponding to various target picture label can be sent to the client, or only partial target pictures corresponding to various target picture label are sent to the client. The client generates the theme video based on these target pictures and rendering data of corresponding theme resource package.

FIG. 6 is an information interaction diagram of the client, the resource server and the preset SDK in the implementation process of the theme video generation method provided by embodiments of the present disclosure. The interaction process may include the following steps.

(1) The client sends the theme resource package acquisition request to the corresponding resource server after acquiring the selection trigger operation on the target theme;

(2) the resource server acquires the corresponding theme resource package based on the identification information that is received and sends the theme resource package to the client in response to the theme resource package acquisition request;

(3) the client makes the target picture labels in the theme package to be carried in the target picture recommendation request to send to the preset SDK;

(4) the preset SDK acquires corresponding target pictures from the local album according to the target picture labels that is received and sends the target pictures to the client in response to the target picture recommendation request; and (5) the client generates corresponding theme video based the target pictures that is received.

Figure 7:
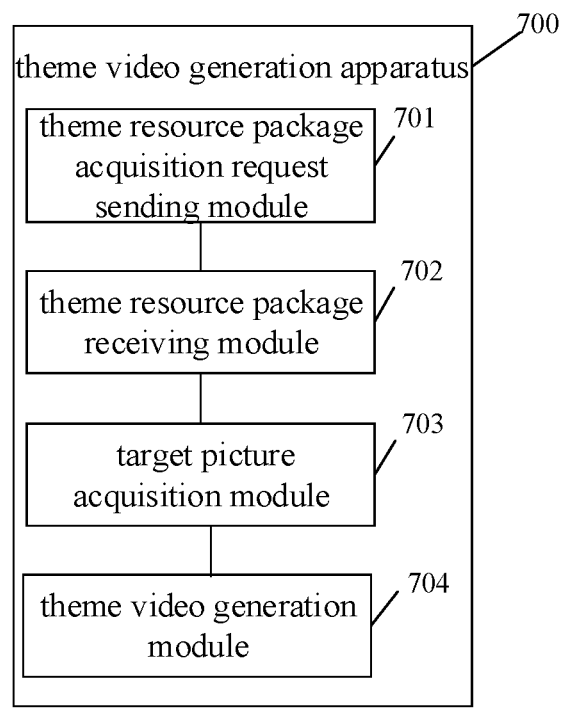
FIG. 7 is a structural block diagram of a theme video generation apparatus provided by embodiments of the present disclosure.

FIG. 7 is a structural block diagram of a theme video generation apparatus provided by embodiments of the present disclosure. As shown in FIG. 7, the apparatus 700 may include: a theme resource package acquisition request sending module 701, a theme resource package receiving module 702, a target picture acquisition module 703 and a theme video generation module 704.

The theme resource package acquisition request sending module 701 is configured to send a theme resource package acquisition request to a corresponding resource server after acquiring a selection trigger operation on a target theme. The theme resource package acquisition request includes identification information of the target theme, so that the corresponding resource server acquires a corresponding theme resource package based on the identification information.

The theme resource package receiving module 702 is configured to receive the corresponding theme resource package that is fed back by the corresponding resource server in response to the theme resource package acquisition request, and the corresponding theme resource package includes at least one target picture label corresponding to the target theme.

The target picture acquisition module 703 is configured to acquire at least one target picture from local album based on the at least one target picture label.

The theme video generation module 704 is configured to generate corresponding theme video based on the at least one target picture.

In the technical solution provided by the present disclosure, in a process of generating a theme video, the user only needs to select a required target theme, and the client can acquire at least one picture label corresponding to the target theme from a source server, then acquire at least one target picture corresponding to the at least one target picture label from a local album based on the at least one picture label, and finally generate a corresponding theme video based on the at least one target picture that is acquired. In the technical solution, the user do not need to select at least one target picture independently, and the at least one corresponding target picture is acquired by at least one picture label corresponding to the target theme, so that the at least one target picture that is acquired can match the target theme better, and the content of the finally generated theme video can be better.

In one optional embodiment of the present disclosure, the apparatus further includes a theme display module which is configured to:

display a current theme display page by a display interface, so as to display one theme among at least one theme before acquiring the selection trigger operation on the target theme by the user; and switch from the current theme display page to another theme display page to display another theme among the at least one theme when receiving a drag trigger operation on the current theme display page.

In one optional embodiment of the present disclosure, the theme resource package acquisition request sending module is specifically configured to:

display a target picture recommendation inquiry page in the display interface after acquiring the selection trigger operation on the target theme through the current theme display page; and send the theme resource package acquisition request to corresponding resource server in response to acquiring a confirmation recommendation trigger operation by the target picture recommendation inquiry page.

In one optional embodiment of the present disclosure, the target picture receiving module is specifically configured to:

display a target picture display page in the display interface, so that the user can select a required target picture from the at least one target picture; and generate the corresponding theme video based on the target pictures selected by the user.

In one optional embodiment of the present disclosure, the theme resource package also includes a suggested picture number corresponding to the target theme, and the apparatus further includes a suggested picture number display module which is configured to:

display a suggested picture number at a preset position of the target picture display page, so that in a case where the user selects the required target picture from the at least one target picture, and the suggested picture number is taken as a reference to determine a count of required target pictures.

In one optional embodiment of the present disclosure, the theme video generation module is specifically configured to:

compare the at least one target picture label with corresponding picture labels of various pictures in the local album, respectively, and taking a picture in the local album as a target picture. A picture label of the target picture is matched with any one of the at least one target picture label, and wherein each of pictures in the local album is marked with a corresponding picture label in advance.

Figure 8:
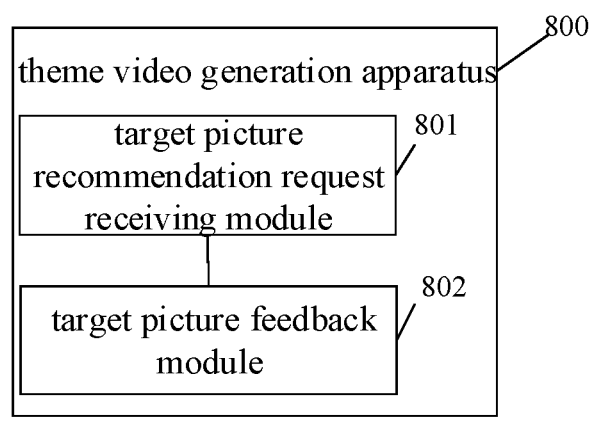
FIG. 8 is a structural block diagram of other theme video generation apparatus provided by embodiments of the present disclosure.

FIG. 8 is a structural block diagram of a theme video generation apparatus provided by embodiments of the present disclosure. As shown in FIG. 8, the apparatus 800 may include: a target picture recommendation request receiving module 801 and a target picture feedback module 802.

The target picture recommendation request receiving module 801 is configured to receive a target picture recommendation request sent by a client, the target picture recommendation request includes at least one target picture label, and the at least one target picture label is acquired from the a corresponding resource server after the client acquires a selection trigger operation on the target theme.

the target picture feedback module 802 is configured to acquire at least one target picture from a local album according to the at least one target picture label, and feed back the at least one target picture to the client in response to the target picture recommendation request, so that the client generates a corresponding theme video based on the at least one target picture.

In the technical solution provided by the present disclosure, in a process of generating a theme video, the user only needs to select a required target theme, and the client can acquire at least one picture label corresponding to the target theme from a source server, then acquire at least one target picture corresponding to the at least one target picture label from a local album based on the at least one picture label, and finally generate a corresponding theme video based on the at least one target picture that is acquired. In the technical solution, the user do not need to select at least one target picture independently, and the at least one corresponding target picture is acquired by at least one picture label corresponding to the target theme, so that the at least one target picture that is acquired can match the target theme better, and the content of the finally generated theme video can be better.

In one optional embodiment of the present disclosure, the apparatus further includes a picture marking module which is configured to:

obtain a corresponding image recognition result by performing image recognition on the pictures in the local album respectively; and acquire corresponding picture labels of the pictures based on the corresponding image recognition result of each picture, and utilize the picture labels to mark the picture.

Correspondingly, the target picture feedback module is specifically configured to:

compare the at least one target picture label with picture labels of various pictures in the local album, and take a picture in the local album of which the picture label is matched with any one of the at least one target picture label as a target picture.

Figure 9:
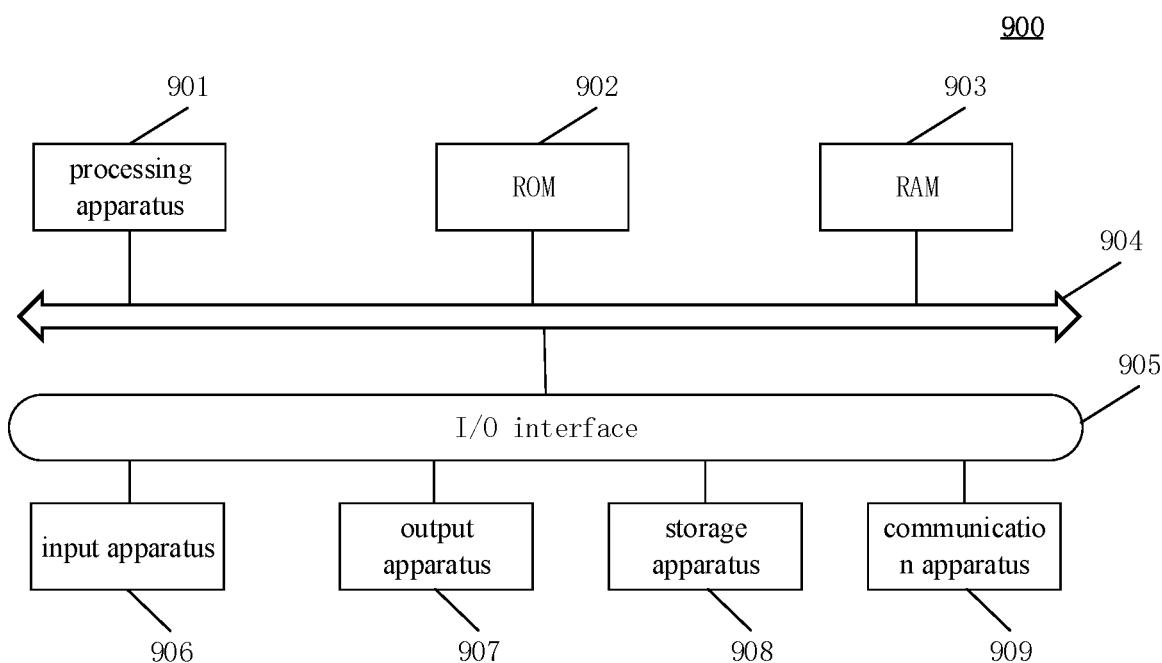
FIG. 9 is a structural schematic diagram of an electronic device provided by embodiments of the present disclosure.

FIG. 9 is a structural schematic diagram of an electronic device (for example, a terminal device or a server for executing the method as shown in FIG. 1 or FIG. 5) 900 for implementing embodiments of the present disclosure. The terminal device in the embodiment of the present disclosure may include but not limited to mobile terminals such as mobile phone, laptop, digital radio receiver, personal digital assistant (PDA), portable android device (PAD), portable multimedia player (PMP) and car terminal (such as car navigation terminal) and fixed terminals such as digital TV and desktop computer. The electronic device as shown in FIG. 9 is only an example and should not restrict the functions and the scope of use of the embodiments of the present disclosure.

The electronic device includes: a memory and a processor. The processor herein may be hereinafter referred to as a processing apparatus 901, and the memory may include at least one of a read-only memory (ROM) 902, a random access memory (RAM) 903 and a storage unit 908 as described below, with the details as follows.

As shown in FIG. 9, the electronic device 900 may include the processing apparatus (e.g., a central processing unit (CPU), a graphics processing apparatus (GPU)) 901 which can execute various appropriate actions and processing according to programs stored in the ROM 902 or programs loaded to the RAM 903 from the storage unit 908. Various programs and data required for the operation of the electronic device 900 are also stored in the RAM 903. The processing apparatus 901, the ROM 902 and the RAM 903 are connected with each other through a bus 904. An input/output (I/O) interface 905 is also connected to the bus 904.

In general, the following apparatus may be connected to the I/O interface 905: an input apparatus 906 including a touch screen, a touch pad, a keyboard, a mouse, a camera, a microphone, an accelerometer, a gyroscope and the like; an output apparatus 907 including a liquid crystal display (LCD), a loudspeaker, a vibrator and the like; a storage apparatus 908 including magnetic tapes and hard disks; and a communication apparatus 909. The communication apparatus 909 may allow the electronic device 900 to perform wireless or wired communication with other devices to exchange data. Although FIG. 9 shows the electronic device including various apparatus, it should be understood that not all the shown apparatus are required to be implemented or included. More or less units can be implemented alternatively or included.

Particularly, according to the embodiments of the present disclosure, the processes described above with reference to the flowcharts can be implemented as computer software programs. For example, an embodiment of the present disclosure provides a computer program product, including computer programs carried on a non-transient computer readable medium. The computer programs include program codes for executing the method as shown in the flowchart. In the embodiment, the computer programs can be unloaded and installed from the internet by the communication apparatus 909, or installed from the storage unit 908, or installed from the ROM 902. The above functions defined in the method provided by the embodiment of the present disclosure are executed when the computer programs are executed by the processing apparatus 901.

It should be noted that the above computer readable medium of the present disclosure may be a computer readable signal medium, a computer readable storage medium, or any combination of the above. The computer readable storage medium, for example, may be, but not limited to, electrical, magnetic, optical, electromagnetic, infrared, or semiconductor system, device, or equipment, or a combination of the above. A more specific example of the computer readable storage medium may include but not limited to: electrical connection having one or more wires, portable computer disk, hard disk, RAM, ROM, erasable programmable read-only memory (EPROM), flash memory, optical fiber, portable compact disk read-only memory (CD-ROM), optical storage unit, magnetic storage unit, or any suitable combination of the above. In the present disclosure, the computer readable storage medium may be any tangible medium that includes or stores programs. The programs may be used by a command execution system, apparatus or device or used in combination with the command execution system, device or unit. In the present disclosure, the computer readable signal medium may include data signals propagated in baseband or as part of carrier, in which computer readable program codes is carried. The propagated data signals may adopt a plurality of forms, including but not limited to electromagnetic signals, optical signals or any suitable combination of the above. The computer readable signal medium may also be any computer readable medium except the computer readable storage medium. The computer readable signal medium can send, propagate or transmit programs used by the command execution system, device or unit or used in combination with the command execution system, apparatus or device. The program codes included in the computer readable medium can be transmitted by any appropriate medium, including but not limited to: wire, optical cable, radio frequency (RF) and the like, or any suitable combination of the above.

In some embodiments, the client and the server may communicate by using any network protocol which is currently known or developed in the future such as hypertext transfer protocol (HTTP), and may be interconnected with digital data communication (e.g., communication network) in any form or medium. The example of the communication network includes local area network (LAN), wide area network (WAN), internet, end-to-end network (e.g., ad hoc end-to-end network), and any network which is current known or developed in the future.

The above computer readable medium may be included in the above electronic device and may also exist alone without being assembled into the electronic device.

The above computer readable medium carries one or more programs. When the above one or more programs are executed by the electronic device, the electronic device is configured to perform steps as follows.

After acquiring a selection trigger operation on a target theme, sending a theme resource package acquisition request to a corresponding resource server, and the theme resource package acquisition request includes identification information of the target theme, so that the corresponding resource server acquires a corresponding theme resource package based on the identification information; receiving the corresponding theme resource package that is fed back by the corresponding resource server in response to the theme resource package acquisition request, and the corresponding theme resource package includes at least one target picture label corresponding to the target theme; acquiring at least one target picture from a local album based on the at least one target picture label; and generating a corresponding theme video based on the at least one target picture.

Or receiving a target picture recommendation request sent by the client, the target picture recommendation request includes at least one target picture label, and the at least one target picture label is acquired from the corresponding resource server after the client acquires the selection trigger operation on the target theme; acquiring at least one target picture from the local album according to the at least one target picture label, and feeding back the at least one target picture to the client in response to the target picture recommendation request, so that the client can generate corresponding theme video according to the at least one target picture.

Computer program codes for performing the operations of the present disclosure may be written in at least one programming languages or a combination thereof. The above programming languages include but not limited to object-oriented programming languages such as Java, Smalltalk and C++, and also include conventional procedural programming languages such as "C" language or similar programming languages. The program codes may be completely executed on a user computer, partially executed on the user computer, executed as a separate package, partially executed on the user computer and partially executed on a remote computer, or completely executed on the remote computer or the server. In the case when the remote computer is involved, the remote computer can be connected to the user computer through any kind of network including LAN or WAN, or can be connected to an external computer (for instance, connected via the Internet by utilization of Internet service providers).

The flowcharts and the block diagrams in the drawings show possible architectures, functions and operations of the system, the method and the computer program product according to the embodiments of the present disclosure. In this regard, each block in the flowchart or the block diagram can represent a module, a program segment, or a part of code. The module, the program segment, or the part of the code contains one or more executable instructions for implementing specified logic functions. It should be also noted that in some alternative implementations, the functions marked in the blocks can also occur in a different order from those marked in the drawings. For instance, two consecutive blocks may actually be executed basically in parallel, and sometimes, can also be executed in a reverse order, determined by involved functions. It should be also noted that each block in the block diagram and/or the flowchart and the combination of the blocks in the block diagram and/or the flowchart can be implemented by a dedicated hardware-based system that performs a specified function or operation, and can also be implemented by the combination of a special hardware and computer instructions.

Modules or units involved in the embodiments of the present disclosure can be implemented by software, and can also be implemented by hardware. Wherein, the name of the module or the unit should not define the unit under certain circumstances. For instance, the theme resource package acquisition request sending module may also be described as "a module for sending a theme resource package acquisition request".

The functions described above in this document can be at least partially executed by one or more hardware logical units. For instance, without limitation, demonstration type hardware logical units that can be used include: field programmable gate array (FPGA), application-specific integrated circuit (ASIC), application specific standard parts (ASSP), system on a chip (SOC), complex programmable logic device (CPLD), etc.

In the context of the present disclosure, the machine readable medium can be a tangible medium and may include or store programs used by command execution system, device or equipment or used in combination with the command execution system, device or equipment. The machine readable medium can be a machine readable signal medium or a machine readable storage medium. The machine readable medium may include but not limited to electronic, magnetic, optical, electromagnetic, infrared, or semiconductor system, device or equipment, or any suitable combination of the above. A more specific example of the machine readable storage medium may include electrical connection based on one or more wires, portable computer disk, hard disk, RAM, ROM, EPROM, flash memory, optical fiber, CD-ROM, optical storage unit, magnetic storage unit, or any suitable combination of the above.

According to at least one of embodiments by the present disclosure, the present disclosure provides a theme video generation method, including:

after acquiring a selection trigger operation on a target theme, sending a theme resource package acquisition request to a corresponding resource server, wherein the theme resource package acquisition request includes identification information of the target theme, so that the corresponding resource server acquires a corresponding theme resource package based on the identification information;

receiving the corresponding theme resource package that is fed back by the corresponding resource server in response to the theme resource package acquisition request, wherein the corresponding theme resource package includes at least one target picture label corresponding to the target theme;

acquiring at least one target picture from a local album based on the at least one target picture label; and generating a corresponding theme video based on the at least one target picture.

According to at least one of embodiments by the present disclosure, before acquiring the selection trigger operation on the target theme by a user, the method further includes:

displaying a current theme display page by a display interface, so as to display a theme in at least one theme; and in a case where a drag trigger operation on the current theme display page is received, switching from the current theme display page to another theme display page, so as to display another theme in the at least one theme.

According to at least one of embodiments by the present disclosure, after acquiring the selection trigger operation on the target theme, sending the theme resource package acquisition request to the corresponding resource server includes:

after acquiring the selection trigger operation on the target theme by the current theme display page, displaying a target picture recommendation inquiry page in the display interface; and in response to acquiring a confirmation recommendation trigger operation by the target picture recommendation inquiry page, sending the theme resource package acquisition request to the corresponding resource server.

According to at least one of embodiments by the present disclosure, generating the corresponding theme video based on the at least one target picture includes:

displaying a target picture display page in a display interface, wherein the target picture display page includes the at least one target picture, so that a user selects a required target picture from the at least one target picture; and generating the corresponding theme video based on the required target picture selected by the user.

According to at least one of embodiments by the present disclosure, the corresponding theme resource package further includes a suggested picture number corresponding to the target theme, and the method further includes:

displaying the suggested picture number at a preset position of the target picture display page, so that in a case where the user selects the required target picture from the at least one target picture, the suggested picture number is taken as a reference to determine a count of required target pictures.

According to at least one of embodiments by the present disclosure, acquiring the at least one target picture from the local album based on the at least one target picture label, includes:

comparing the at least one target picture label with corresponding picture labels of various pictures in the local album, respectively, and taking a picture in the local album as a target picture, wherein a picture label of the target picture is matched with any one of the at least one target picture label, and wherein each of pictures in the local album is marked with a corresponding picture label in advance.

According to at least one of embodiments by the present disclosure, the present disclosure provides a theme video generation method, including:

receiving a target picture recommendation request sent by a client, the target picture recommendation request includes at least one target picture label, and the at least one target picture label is acquired from a corresponding resource server after the client acquires a selection trigger operation on the target theme;

acquiring at least one target picture from the local album based on the at least one target picture label, and feeding back the at least one target picture to the client in response to the target picture recommendation request, so that the client generates a corresponding theme video based on the at least one target picture.

According to at least one of embodiments by the present disclosure, the method further includes:

obtaining corresponding image recognition result by performing image recognition on the pictures in the local album respectively; and acquiring a picture label corresponding to a picture based on corresponding image recognition result of each picture, and marking the picture by using the picture label.

According to at least one of embodiments by the present disclosure, acquiring the at least one target picture from the local album based on the at least one target picture label includes:

comparing the at least one target picture label with corresponding picture labels of various pictures in the local album, respectively, and taking a picture in the local album as a target picture, wherein a picture label of the target picture is matched with any one of the at least one target picture label.

According to at least one of embodiments by the present disclosure, the present disclosure provides a theme video generation apparatus, including:

a theme resource package acquisition request sending module, configured to, after acquiring a selection trigger operation on a target theme, send a theme resource package acquisition request to a corresponding resource server, wherein the theme resource package acquisition request includes identification information of the target theme, so that the corresponding resource server acquires a corresponding theme resource package based on the identification information;

a theme resource package receiving module, configured to receive the corresponding theme resource package that is fed back by the corresponding resource server in response to the theme resource package acquisition request, wherein the corresponding theme resource package includes at least one target picture label corresponding to the target theme;

a target picture acquisition module, configured to, based on the at least one target picture label, acquire at least one target picture from a local album; and a theme video generation module, configured to, based on the at least one target picture, generate a corresponding theme video.

According to at least one of embodiments by the present disclosure, the present disclosure provides a theme video generation apparatus, including:

a target picture recommendation request receiving module, configured to receive a target picture recommendation request sent by a client, the target picture recommendation request includes at least one target picture label, and the at least one target picture label is acquired from a corresponding resource server after the client acquires a selection trigger operation on the target theme;

a target picture feedback module, configured to acquire at least one target picture from the local album according to the at least one target picture label, and feed back the at least one target picture to the client in response to the target picture recommendation request, so that the client generates the corresponding theme video based on the at least one target picture.

According to at least one of embodiments by the present disclosure, the present disclosure provides an electronic device, including a memory and a processor, computer programs are stored in the memory, and the processor is configured to execute the computer programs to implement the method according to any one of above embodiments.

According to at least one of embodiments by the present disclosure, the present disclosure provides a computer readable storage medium, wherein computer programs are stored on the computer readable storage medium, and in a case where the computer programs are executed by a processor, the method according to any one of above embodiments.

The above description is only the preferred embodiment of the present disclosure and the explanation of the applied technical principle. It should be understood by those skilled in the art that the disclosure scope involved in this disclosure is not limited to the technical scheme formed by the specific combination of the above technical features, but also covers other technical schemes formed by any combination of the above technical features or their equivalent features without departing from the above disclosed concept. For example, the technical solution formed by replacing the above features with (but not limited to) technical features with similar functions disclosed in this disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments can also be implemented in a single embodiment in combination. On the contrary, various features described in the context of a single embodiment can also be implemented in multiple embodiments alone or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms of realizing the claims.

What is claimed is:

1. A theme video generation method, comprising:

in response to a selection trigger operation on a target theme, sending a theme resource package acquisition request to a corresponding resource server, wherein the theme resource package acquisition request comprises identification information of the target theme, so that the corresponding resource server acquires a corresponding theme resource package based on the identification information;

receiving the corresponding theme resource package that is fed back by the corresponding resource server in response to the theme resource package acquisition request, wherein the corresponding theme resource package comprises at least one target picture label corresponding to the target theme;

acquiring target pictures from a local album based on the at least one target picture label; and generating a corresponding theme video based on the target pictures, wherein generating the corresponding theme video based on the target pictures comprises:

displaying a target picture display page in a display interface, wherein the target picture display page comprises the target pictures, so that a user is enabled to select required target pictures based on preference from the target pictures belonging to the target picture label; and generating the corresponding theme video composed of the required target pictures selected by the user.

2. The method according to claim 1, wherein before in response to the selection trigger operation on the target theme, the method further comprises:

displaying a current theme display page by the display interface, so as to display a theme among at least one theme; and in a case where a drag trigger operation on the current theme display page is received, switching from the current theme display page to another theme display page, so as to display another theme among the at least one theme.

3. The method according to claim 2, wherein after in response to the selection trigger operation on the target theme, sending the theme resource package acquisition request to the corresponding resource server comprises:

in response to the selection trigger operation on the target theme by the current theme display page, displaying a target picture recommendation inquiry page in the display interface; and in response to a confirmation recommendation trigger operation by the target picture recommendation inquiry page, sending the theme resource package acquisition request to the corresponding resource server.

4. The method according to claim 1, wherein the corresponding theme resource package further comprises a suggested picture number corresponding to the target theme, and the method further comprises:

displaying the suggested picture number at a preset position of the target picture display page, so that in a case where the user selects the required target pictures from target pictures, the suggested picture number is taken as a reference to determine a count of the required target pictures.

5. The method according to claim 1, wherein acquiring the target pictures from the local album based on the at least one target picture label, comprises:

comparing the at least one target picture label with corresponding picture labels of various pictures in the local album, respectively, and taking a picture in the local album as a target picture, wherein a picture label of the target picture is matched with any one of the at least one target picture label, and wherein each of pictures in the local album is marked with a corresponding picture label in advance.

6. A theme video generation apparatus, comprising:

a theme resource package acquisition request sending module, configured to, in response to a selection trigger operation on a target theme, send a theme resource package acquisition request to a corresponding resource server, wherein the theme resource package acquisition request comprises identification information of the target theme, so that the corresponding resource server acquires a corresponding theme resource package based on the identification information;

a theme resource package receiving module, configured to receive the corresponding theme resource package that is fed back by the corresponding resource server in response to the theme resource package acquisition request, wherein the corresponding theme resource package comprises at least one target picture label corresponding to the target theme;

a target picture acquisition module, configured to, based on the at least one target picture label, acquire target pictures from a local album; and a theme video generation module, configured to, based on the target pictures, generate a corresponding theme video, wherein generating the corresponding theme video based on the target pictures comprises:

displaying a target picture display page in a display interface, wherein the target picture display page comprises the target pictures, so that a user is enabled to select required target pictures based on preference from the target pictures belonging to the target picture label; and generating the corresponding theme video composed of the required target pictures selected by the user.

7. An electronic device, comprising a memory and a processor, wherein computer programs are stored in the memory, and the processor is configured to execute the computer programs to implement the method according to claim 1.

8. A non-transitory computer-readable storage medium, wherein computer programs are stored on the non-transitory computer-readable storage medium, and in a case where the computer programs are executed by a processor, the method according to claim 1 is implemented.

9. The method according to claim 2, wherein acquiring the target pictures from the local album based on the at least one target picture label, comprises:

comparing the at least one target picture label with corresponding picture labels of various pictures in the local album, respectively, and taking a picture in the local album as a target picture, wherein a picture label of the target picture is matched with any one of the at least one target picture label, and wherein each of pictures in the local album is marked with a corresponding picture label in advance.

10. The method according to claim 3, wherein acquiring the target pictures from the local album based on the at least one target picture label, comprises:

comparing the at least one target picture label with corresponding picture labels of various pictures in the local album, respectively, and taking a picture in the local album as a target picture, wherein a picture label of the target picture is matched with any one of the at least one target picture label, and wherein each of pictures in the local album is marked with a corresponding picture label in advance.

11. The method according to claim 4, wherein acquiring the target pictures from the local album based on the at least one target picture label, comprises:

comparing the at least one target picture label with corresponding picture labels of various pictures in the local album, respectively, and taking a picture in the local album as a target picture, wherein a picture label of the target picture is matched with any one of the at least one target picture label, and wherein each of pictures in the local album is marked with a corresponding picture label in advance.

12. An electronic device, comprising a memory and a processor, wherein computer programs are stored in the memory, and the processor is configured to execute the computer programs to implement the method according to claim 2.

13. An electronic device, comprising a memory and a processor, wherein computer programs are stored in the memory, and the processor is configured to execute the computer programs to implement the method according to claim 3.

14. A non-transitory computer-readable storage medium, wherein computer programs are stored on the non-transitory computer-readable storage medium, and in a case where the computer programs are executed by a processor, the method according to claim 2 is implemented.

15. A non-transitory computer-readable storage medium, wherein computer programs are stored on the non-transitory computer-readable storage medium, and in a case where the computer programs are executed by a processor, the method according to claim 3 is implemented.

* * * * *